United States Patent Office 3,326,963
Patented June 20, 1967

3,326,963
NOVEL TROPOLONE DERIVATIVES
John Krapcho, Somerset, N.J., assignor, by mesne assignments, to E. R. Squibb & Sons, Inc., New York, N.Y., a corporation of Delaware
No Drawing. Filed Dec. 26, 1962, Ser. No. 247,274
3 Claims. (Cl. 260—473)

This invention relates to new compounds and more particularly to compounds of the general Formula I:

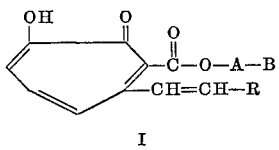

I and acid-addition and quaternary ammonium salts thereof, wherein A is lower alkylene; B is a basic nitrogen-containing radical of less than 12 carbon atoms; and R is phenyl, an $(X)_n$-substituted phenyl, thienyl, furyl, nitrofuryl, pyridyl, naphthyl and indolyl, wherein X is hydrogen, halogen (e.g., chloro and bromo), trifluoromethyl, nitro, lower alkyl, lower alkoxy and lower alkenoyl (e.g., acetyl and propionyl), and $n$ is 1, 2 and 3.

Among the suitable radicals represented by the symbol B are:

amino, (lower alkyl)amino;
di(lower alkyl)amino;
(hydroxy-lower alkyl)amino;
di(hydroxy-lower alkyl)amino;
$(X)_n$-substituted phenyl(lower alkyl)amino;
N-(lower alkyl)-N-[$(X)_n$-substituted phenyl (lower alkyl)]-amino;
allylamino;
diallylamino;

and saturated 5 to 6 membered monocyclic heterocyclic radicals of les than twelve carbon atoms, as exemplified by piperidino;

(lower alkyl)piperidino;
di(lower alkyl)piperidino;
(lower alkoxy)piperidino;
2,3 or 4-piperidyl;
2,3 or 4-(N-lower alkylpiperidyl);
pyrrolidino;
(lower alkyl)pyrrolidino;
di(lower alkyl)pyrrolidino;
(lower alkoxy)pyrrolidino;
2 or 3-pyrrolidyl;
2 or 3-(N-lower alkyl-pyrrolidyl);
morpholino;
(lower alkyl)morpholino;
di(lower allky)morpholino;
(lower alkoxy)morpholino;
thiamorpholino;
(lower alkyl)thiamorpholino;
di(lower alkyl)thiamorpholino;
(lower alkoxy)thiamorpholino;
piperazino;
(lower alkyl)piperazino (e.g., $N^4$-methylpiperazino);
di(lower alkyl)piperazino;
(lower alkoxy)piperazino;
(hydroxy-lower alkyl)piperazino (e.g. $N^4$-2-hydroxyethylpiperazino;
(lower alkanoyloxy-lower alkyl)piperazino (e.g. $N^4$-2-acteoxyethylpiperazino); and
(hydroxy-lower alkoxy-lower alkyl)piperazino (e.g. $N^4$-2-hydroxyethoxyethylpiperazino.

The term "lower alkyl" and "lower alkoxy" as employed herein include both straight and branched chain radicals of less than eight carbon atoms.

The preferred compounds are those wherein B is di-(lower alkyl)amino or $N^4$-methylpiperazino; A is ethylene or propylene; and R is phenyl, alkoxy phenyl, halo phenyl, 2-thienyl, 2-furyl 5-nitrofuryl or 4-pyridyl. Particularly preferred are those compounds wherein B is di(lower alkyl)amino; A is ethylene or propylene and R is phenyl.

As to the salts, those coming within the purview of this invention include acid-addition salts, particularly the non-toxic quaternary ammonium salts. Acids useful for preparing the acid-addition salts include inter alia, inorganic acids, such as the hydrohalic acids (e.g. hydrochloric and hydrobromic acid), sulfuric acid, nitric acid, and phosphoric acid, and organic acids, such as oxalic, tartaric, malic, citric, acetic and succinic acid. Salts useful in preparing the quaternary ammonium salts include, inter alia, the lower alkyl halides and sulfates (e.g. methyl chloride, methyl bromide and diethyl sulfate) and the monocyclic aryl(lower alkyl) halides and sulfates (e.g. benzyl chloride).

The compounds of this invention are therapeutically active substances which exhibit anti-microbial activity. The compounds of this invention are useful as microbicides against such organisms as *Staphylococcus aureas, K. pneumoniae, Trichophyton metagrophytes, Bacillus calmette-guerin.*

The compounds of this invention may be administered orally, parenterally or topically, the dosage being adjusted for the relative potency of the particular compound, for example, the compounds of this invention may be administered topically in the form of an ointment or cream, the vehicle for which may be any pharmaceutically acceptable one known to the art to be useful for such purposes. Oral administration may be accomplished in the manner known to the art, for example, by tablet or capsule dosage forms, the dosage being adjusted for the particular compound employed and the requirements of the patient being treated.

The preferred and general method for preparing the compounds of this invention involves reacting a dicarboxylic acid of the general formula

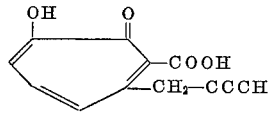

II with an aromatic aldehyde of the formula R—CHO wherein R is as hereinbefore defined, to yield new styryl monocarboxylic acid intermediates of this invention of the general formula

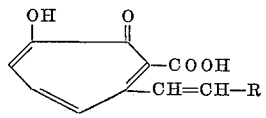

III wherein R is as hereinbefore defined.

Suitable aromatic aldehydes include benzaldehyde, chlorobenzaldehyde, trifluoromethylbenzaldehyde, alkoxybenzaldehyde, such as trimethoxybenzaldehyde, indolealdehyde, furaldehyde, naphthaldehyde, pyridinealdehyde, thiophenealdehyde, nitrobenzaldehyde, toluylaldehyde, piperonyl aldehyde and 5-nitrofuraldehyde.

The styryl mono-carboxylic acid of Formula II is then esterified by reaction with an appropriate basically substituted alkyl halide to yield the final products of this invention. Suitable basically substituted alkyl halides include amino (lower alkyl) chlorides, such as 2-aminoethyl chloride and 3-aminopropyl chloride; (lower alkyl)-amino(lower alkyl)chlorides such as methylaminomethyl chloride, 2-methylaminoethyl chloride, and 3-ethylaminopropyl chloride; di(lower alkyl)amino(lower alkyl) chlorides, such as 2-dimethylaminoethyl chloride, 3-dimethylaminopropyl chloride, 5-diethylaminopentyl chloride, and 2-dipropylaminohexyl chloride; (hydroxy-lower alkyl)-amino(lower alkyl) chlorides, such as 2-(hydroxy ethyl)-aminoethyl chloride; di(hydroxy-lower alkyl)amino-(lower alkyl) chlorides such as 3-(2-hydroxyethyl)amino-propyl chloride; phenyl(lower alkyl)amino(lower alkyl)-chlorides, such as 2-benzylaminoethyl chloride, 3-phenethylaminopropyl chloride, and 4-benzylaminobutyl chloride, and halo trifluoromethyl, nitro, lower alkyl and lower alkoxy substituted phenyl derivatives thereof; N-(lower alkyl)phenyl(lower alkyl)amino chlorides, such as 2-(benzyl-methylamino)ethyl chloride, and halo, trifluoromethyl, nitro, lower alkyl and lower alkoxy substituted phenyl derivatives thereof; allyl amino(lower alkyl)chlorides, such as 2-allylaminoethyl chloride; di-(allyl)amino(lower alkyl) chlorides, such as 3-diallylaminopropyl chloride; and saturated 5 to 6 membered monocyclic heterocyclic lower alkyl chlorides.

The following examples illustrate the invention, all temperatures being in degrees centigrade.

EXAMPLE 1

*6-hydroxy-7-oxo-2-styril-1,3,5-cycloheptatriene-1-carboxlic acid, ester with 2-diethylaminoethanol*

A. 6-HYDROXY-7-OXO-2-STYRYL-1,3,5-CYCLOHEPTATRIENE-1-CARBOXYLIC ACID (II)

The reaction of 24.0 g. of 3-carboxy-4-carboxymethyltropolone with 12 ml. of benzaldehyde is carried out under the reaction conditions set forth in the Journal of the American Chemical Society, vol. 81, page 3443 (1959), to yield 25 g. of a crude yellow-brow product, M.P. about 163–166° C. This material is then triturated with 50 ml. of hot acetonitrile, cooled and filtered to yield 16.5 g. of 6-hydroxy-7-oxo-2-styryl-1,3,5-cycloheptatriene-1-carboxylic acid having a melting point of about 169–171° C.

B. 6-HYDROXY-7-OXO-2-STYRYL-1,3,5 - CYCLOHEPTATRIENE-1-CARBOXYLIC ACID, ESTER WITH 2-DIETHYL-AMINOETHANOL

A mixture of 13.4 g. of 6-hydroxy-7-oxo-2-styryl-1,3,5-cycloheptatriene-1-carboxylic acid in 200 ml. of isopropyl alcohol is added to a solution of 1.15 g. of sodium in 200 ml. of isopropyl alcohol. The sodium salt of the acid precipitates from the mixture. After stirring for 30 minutes, the mixture is treated with 8.0 g. of 2-diethylaminoethyl chloride and heated to reflux temperature. 200 ml. of diglyme is added, the mixture continued to reflux for four hours, and the solvent removed under reduced pressure. The residue is treated with 100 ml. of water, filtered and dried to yield 15.0 g. of 6-hydroxy-7-oxo-2-styryl-1,3,5-cycloheptatriene-1-carboxylic acid, ester with 2-diethylaminoethanol, having a melting point of about 149–150° C. After crystallization from 450 ml. of acetonitrile 11.2 g. of 6-hydroxy-7-oxo-2-styryl-1,3,5-cycloheptatriene-1-carboxylic acid, ester with 2-diethylaminoethanol, having a melting point of about 151–152° C., is obtained.

EXAMPLE 2

*6-hydroxy-7-oxo-2-styryl-1,3,5-cycloheptatriene-1-carboxylic acid, ester with 2-diethylaminoethanol, hydrochloride*

A suspension of 1.0 g. of 6-hydroxy-7-oxo-2-styryl-1,3,5-cycloheptatriene-1-carboxylic acid, ester with 2-diethylaminoethanol in 47 ml. of water is treated with 2.7 ml. of N-hydrochloric acid and the resulting solution is evaporated under reduced pressure to yield the hydrochloride salt of 6-hydroxy-7-oxo-2-styryl-1,3,5-cycloheptatriene-1-carboxylic acid, ester with 2-diethylaminoethanol.

EXAMPLE 3

*6-hydroxy-7-oxo-2-styryl-1,3,5-cycloheptatriene-1-carboxylic acid, ester with 2-diethylaminoethanol, methochloride*

A suspension of 5.0 g. of 6-hydroxy-7-oxo-2-styryl-1,3,5-cycloheptatriene-1-carboxylic acid ester with 2-diethylaminoethanol in 150 ml. of acetonitrile is treated with 15 g. of methyl chloride. After standing for one day at room temperature, the solvent is removed under reduced pressure to give the methochloride salt of 6-hydroxy - 7 - oxo - 2 - styryl - 1,3,5 - cycloheptatriene - 1-carboxylic acid, ester with 2-diethylaminoethanol.

EXAMPLE 4

*6-hydroxy-7-oxo-2-styryl-1,3,5-cycloheptatriene-1-carboxylic acid, ester with 3-dimethylaminopropanol*

Following the procedure of Example 1, part B, but substituting an equivalent amount of 3-dimethylaminopropyl chloride for 2-diethylaminoethyl chloride yields 6-hydroxy - 7 - oxo - 2-styryl - 1,3,5 - cycloheptatriene - 1-carboxylic acid, ester with 3-dimethylaminopropanol.

EXAMPLE 5

*6-hydroxy-7-oxo-2-styryl-1,3,5-cycloheptatriene-1-carboxylic acid, ester with N'-(3-hydroxypropyl)-$N^4$-methylpiperazine*

Following the procedure set forth in Example 1, part B, but substituting an equivalent amount of N'-(3-chloropropyl) - $N^4$ - methylpiperazine for 2-diethylaminoethyl chloride yields 6-hydroxy-7-oxo-2-styryl-1,3,5-cycloheptatriene-1-carboxylic acid, ester with N'-(3-hydroxypropyl)-$N^4$-methylpiperazine.

EXAMPLE 6

*6 - hydroxy - 7 - oxo - 2 - (4 - chlorostyryl) - 1,3,5 - cycloheptatriene-1-carboxylic acid, ester with 2-diethylaminoethanol*

A. 6-HYDROXY-7-OXO-2-(4-CHLOROSTYRYL)-1,3,5-CYCLOHEPTATRIENE-1-CARBOXYLIC ACID

Following the procedure set forth in Example 1, part A, but substituting an equivalent amount of 4-chlorobenzaldehyde for benzaldehyde there is obtained 6-hydroxy - 7 - oxo - 2 - (4 - chlorostyryl) - 1,3,5 - cycloheptatriene-1-carboxylic acid.

B. 6-HYDROXY-7-OXO - 2 - (4 - CHLOROSTYRYL)-1,3,5-CYCLOHEPTATRIENE - 1 - CARBOXYLIC ACID, ESTER WITH 2-DIETHYLAMINOETHANOL

Following the procedure set forth in Example 1, part B, but substituting 6-hydroxy-7-oxo-2-(4-chlorostyryl)-1,3,5-cycloheptatriene-1-carboxylic acid for 6-hydroxy-7-oxo - 2 - styryl - 1,3,5 - cycloheptatriene - 1 - carboxylic acid, there is obtained 6-hydroxy-7-oxo-2-(4-chlorostyryl)-1,3,5-cycloheptatriene-1-carboxylic acid, ester with 2-diethylaminoethanol.

Similarly, when the 6-hydroxy-7-oxo-2-(4-chlorostyryl)-1,3,5-cycloheptatriene-1-carboxylic acid is employed in the procedures set forth in Examples 4 and 5, there is obtained the 3-dimethylaminopropanol and N'-(3-hydroxypropyl)-$N^4$-methyl-piperazine esters of 6-hydroxy-7-oxo - 2 - (4-chlorostyryl) - 1,3,5 - cycloheptatriene-1-carboxylic acid, respectively.

EXAMPLE 7

*6-hydroxy-7-oxo-2-(3-trifluoromethylstyryl) - 1,3,5-cycloheptatriene-1-carboxylic acid, ester with 2-diethylaminoethanol*

A. 6-HYDROXY-7-OXO-2-(3-TRIFLUOROMETHYLSTYRYL)-1,3,5-CYCLOHEPTATRIENE-1-CARBOXYLIC ACID

Following the procedure set forth in Example 1, part A, but substituting an equivalent amount of 3-trifluoromethylbenzaldehyde for benzaldehyde there is obtained 6-hydroxy-7-oxo-2-(3-trifluoromethylstyryl) - 1,3,5-cycloheptatriene-1-carboxylic acid.

B. 6-HYDROXY-7-OXO-2-(3-TRIFLUOROMETHYLSTYRYL)-1,3,5-CYCLOHEPTATRIENE-1-CARBOXYLIC ACID, ESTER WITH 2-DIETHYLAMINOETHANOL

Following the procedure set forth in Example 1, part B, but substituting 6-hydroxy-7-oxo-2-(3-trifluoromethylstyryl)-1,3,5-cycloheptatriene-1-carboxylic acid for 6-hydroxy-7-oxo-2-styryl - 1,3,5 - cycloheptatriene - 1 - carboxylic acid, there is obtained 6-hydroxy-7-oxo-2-(3-trifluoromethylstyryl)-1,3,5-cycloheptatriene - 1 - carboxylic acid, ester with 2-diethylaminoethanol.

Similarly, following the procedures of Examples 4 and 5 but employing 6-hydroxy-7-oxo-2-(3-trifluoromethylstyryl)-1,3,5-cycloheptatriene-1-carboxylic acid yields the dimethylaminopropanol ester and the N'-(3-hydroxypropyl)-N$^4$-methylpiperazine ester thereof respectively.

EXAMPLE 8

*6-hydroxy-7-oxo-2-(3,4,5-trimethoxystyryl)-1,3,5 - cycloheptatriene - 1 - carboxylic acid, ester with 2-diethylaminoethanol*

A. 6-HYDROXY-7-OXO-2-(3,4,5-TRIMETHOXYSTYRYL)-1,3,5-CYCLOHEPTATRIENE-1-CARBOXYLIC ACID

Following the procedure set forth in Example 1, part A, but substituting an equivalent amount of 3,4,5-trimethoxybenzaldehyde for benzaldehyde there is obtained 6-hydroxy-7-oxo-2-(3,4,5-trimethoxystyryl) - 1,3,5-cycloheptatriene-1-carboxylic acid.

B. 6-HYDROXY-7-OXO - 2 - (3,4,5 - TRIMETHOXYSTYRYL)-1,3,5-CYCLOHEPTATRIENE-1-CARBOXYLIC ACID, ESTER WITH 2-DIETHYLAMINOETHANOL

Following the procedure set forth in Example 1, part B, but substituting 6-hydroxy-7-oxo-2-(3,4,5-trimethoxystyryl)-1,3,5-cycloheptatriene-1-carboxylic acid for 6-hydroxy-7-oxo-2-styryl-1,3,5 - cycloheptatriene - 1 - carboxylic acid there is obtained 6-hydroxy-7-oxo-2-(3,4,5-trimethoxystyryl)-1,3,5 - cycloheptatriene - 1 - carboxylic acid, ester with 2-diethylaminoethanol.

Similarly, following the procedures set forth in Examples 4 and 5 but employing 6-hydroxy-7-oxo-2-(3,4,5-trimethoxystyryl)-1,3,5 - cycloheptatriene - 1 - carboxylic acid yields the 2-dimethylaminopropanol and N'-(3-hydroxypropyl) - N$^4$ - methylpiperazine esters thereof, respectively.

EXAMPLE 9

*6-hydroxy-7-oxo-2-(indolyl-β-vinylene) - 1,3,5 - cycloheptatriene-1-carboxylic acid, ester with 2-diethylaminoethanol*

A. 6-HYDROXY-7-OXO-2-(INDOLYL-β-VINYLENE)-1,3,5-CYCLOHEPTATRIENE-1-CARBOXYLIC ACID

Following the procedure set forth in Example 1, part A, but substituting an equivalent amount of β-indolealdehyde for benzaldehyde there is obtained 6-hydroxy-7-oxo-2-(indolyl-β-vinylene)-1,3,5-cycloheptatriene-1 - carboxylic acid.

B. 6-HYDROXY-7-OXO-2-(INDOLYL - β - VINYLENE)-1,3,5-CYCLOHEPTATRIENE-1-CARBOXYLIC ACID, ESTER WITH 2-DIETHYLAMINOETHANOL

Following the procedure set forth in Example 1, part B, but substituting 6 - hydroxy-7-oxo-2-(indolyl-β-vinylene)-1,3,5-cycloheptatriene-1-carboxylic acid for 6-hydroxy-7-oxo-2-styryl-1,3,5-cycloheptatriene - 1 - carboxylic acid there is obtained 6-hydroxy-7-oxo-2-(indolyl-β-vinylene)-1,3,5-cycloheptatriene-1-carboxylic acid, ester with 2-diethylaminoethanol.

Similarly, following the procedure set forth in Examples 4 and 5 but employing 6-hydroxy-7-oxo-2-(indolyl-β-vinylene) - 1,3,5 - cycloheptatriene - 1 - carboxylic acid yields the 2-dimethylaminopropanol and N-(3-hydroxypropyl)-N$^4$-methylpiperazine esters thereof respectively.

EXAMPLE 10

*6-hydroxy-7-oxo-2-(furyl-α-vinylene) - 1,3,5 - cycloheptatriene-1-carboxylic acid, ester with 2-diethylaminoethanol.*

A. 6-HYDROXY-7-OXO-2-(FURYL-α-VINYLENE)-1,3,5-CYCLOHEPTATRIENE-1-CARBOXYLIC ACID

Following the procedure set forth in Example 1, part A, but substituting α-furaldehyde for benzaldehyde there is obtained 6 - hydroxy - 7-oxo - 2-(furyl-α-vinylene)-1,3,5-cycloheptatriene-1-carboxylic acid.

Similarly, following the procedure of Example 1, part A, but substituting 5-nitro-α-furaldehyde for benzaldehyde there is obtained 6-hydroxy-7-oxo-2-(5-nitro furyl-α-vinylene)-1,3,5-cycloheptatriene-1-carboxylic acid.

B. 6-HYDROXY-7-OXO-2-(FURYL - α - VINYLENE)-1,3,5-CYCLOHEPTATRIENE - 1 - CARBOXYLIC ACID, ESTER WITH 2-DIETHYLAMINOETHANOL

Following the procedure set forth in Example 1, part B, but substituting 6-hydroxy-7-oxo-2-(furyl-α-vinylene)-1,3,5-cycloheptatriene-1-carboxylic acid for 6-hydroxy-7-oxo-2-styryl-1,3,5-cycloheptatriene-1-carboxylic acid there is obtained 6-hydroxy-7-oxo-2-(furyl-α-vinylene)-1,3,5-cycloheptatriene-1-carboxylic acid, ester with 2-diethylaminoethanol.

Similarly, following the procedure set forth in Example 1, part B, but substituting 6-hydroxy-7-oxo-2-(5-nitrofuryl-α-vinylene)-1,3,5-cycloheptatriene-1-carboxylic acid for 6-hydroxy-7-oxo-2-styryl-1,3,5-cycloheptatriene-1-carboxylic acid there is obtained 6-hydroxy-7-oxo-2-(5-nitrofuryl-α-vinylene)-1,3,5 - cycloheptatriene - 1 - carboxylic acid, ester with 2-diethylaminoethanol.

Similarly, following the procedure set forth in Examples 4 and 5 but employing 6-hydroxy-7-oxo-2-(furyl-α-vinylene)-1,3,5-cycloheptatriene-1-carboxylic acid yields the 2-dimethylaminopropanol and N-(3-hydroxypropyl)-N$^4$-methylpiperazine esters thereof respectively.

EXAMPLE 11

*6-hydroxy-7-oxo-2-(naphthyl-α-vinylene)-1,3,5-cycloheptatriene-1-carboxylic acid, ester with 2-diethylaminoethanol*

A. 6-HYDROXY-7-OXO-2-(NAPHTHYL-α-VINYLENE)-1,3,5-CYCLOHEPTATRIENE-1-CARBOXYLIC ACID

Following the procedure of Example 1, part A, but substituting α-naphthaldehyde for benzaldehyde there is obtained 6-hydroxy-7-oxo-2-(naphthyl-α-vinylene)-1,3,5-cycloheptatriene-1-carboxylic acid.

B. 6-HYDROXY-7-OXO-2-(NAPHTHYL-α-VINYLENE)-1,3,5-CYCLOHEPTATRIENE - 1 - CARBOXYLIC ACID, ESTER WITH 2-DIETHYLAMINOETHANOL

Following the procedure of Example 1, part B, but substituting 6-hydroxy-7-oxo-2-(naphthyl-α-vinylene)-1,3,5-cycloheptatriene-1-carboxylic acid for 6-hydroxy-7-oxo-2-styryl-1,3,5-cycloheptatriene-1-carboxylic acid there is obtained 6-hydroxy-7-oxo-2-(naphthyl-α-vinylene)-1,3,5-cycloheptatriene-1-carboxylic acid, ester with 2-diethylaminoethanol.

Similarly, following the procedure set forth in Examples 4 and 5 but employing 6-hydroxy-7-oxo-2-(naphthyl-α-vinylene)-1,3,5-cycloheptatriene-1-carboxylic acid yields the 2-dimethylaminopropanol and N-(3-hydroxypropyl)-N$^4$-methylpiperazine esters thereof respectively.

EXAMPLE 12

*6-hydroxy-7-oxo-2-(pyridyl-γ-vinylene)-1,3,5 - cycloheptatriene-1-carboxylic acid, ester with 2-diethylaminoethanol*

A. 6-HYDROXY-7-OXO-2-(PYRIDYL-γ-VINYLENE)-1,3,5-CYCLOHEPTATRIENE-1-CARBOXYLIC ACID

Following the procedure set forth in Example 1, part A, but substituting pyridine-γ-aldehyde for benzaldehyde there is obtained 6-hydroxy-7-oxo-2-(pyridyl-γ-vinylene)-1,3,5-cycloheptatriene-1-carboxylic acid.

B. 6-HYDROXY-7-OXO-2-(PYRIDYL-γ-VINYLENE)-1,3,5-CYCLOHEPTATRIENE-1-CARBOXYLIC ACID, ESTER WITH 2-DIETHYLAMINOETHANOL

Following the procedure set forth in Example 1, part B, but substituting 6-hydroxy-7-oxo-2-(pyridyl-γ-vinylene)-1,3,5-cycloheptatriene-1-carboxylic acid for 6-hydroxy-7-oxo-2-styryl-1,3,5-cycloheptatriene-1-carboxylic acid there is obtained 6-hydroxy-7-oxo-2-(pyridyl-γ-vinylene)-1,3,5-cycloheptatriene-1-carboxylic acid, ester with 2-diethylaminoethanol.

Similarly, following the procedure set forth in Examples 4 and 5 but employing 6-hydroxy-7-oxo-2-(pyridyl-γ-vinylene)-1,3,5-cycloheptatriene-1-carboxylic acid yields the 3-dimethylaminopropanol and N-(3-hydroxypropyl)-N⁴-methylpiperazine esters thereof respectively.

EXAMPLE 13

6-hydroxy-7-oxo-2-(thienyl-α-vinylene) - 1,3,5 - cycloheptatriene-1-carboxylic acid, ester with 2-diethylaminoethanol A. 6-HYDROXY-7-OXO-2-(THIENYL-α-VINYLENE)-1,3,5-CYCLOHEPTATRIENE-1-CARBOXYLIC ACID Following the procedure set forth in Example 1, part A, but substituting 2-thiophenealdehyde for benzaldehyde there is obtained 6-hydroxy-7-oxo-2-(thienyl-α-vinylene)-1,3,5-cycloheptatriene-1-carboxylic acid.

B. 6-HYDROXY-7-OXO-2-(THIENYL-α-VINYLENE)-1,3,5-CYCLOHEPTATRIENE-1-CARBOXYLIC ACID, ESTER WITH 2-DIETHYLAMINOETHANOL

Following the procedure set forth in Example 1, part B, but substituting 6-hydroxy-7-oxo-2-(thienyl-α-vinylene)-1,3,5-cycloheptatriene-1-carboxylic acid for 6-hydroxy-7-oxo-2-styryl-1,3,5-cycloheptatriene-1-carboxylic acid there is obtained 6-hydroxy-7-oxo-2-(thienyl-α-vinylene)-1,3,5-cycloheptatriene-1-carboxylic acid, ester with 2-diethylaminoethanol.

Similarly, following the procedure set forth in Examples 4 and 5 but employing 6-hydroxy-7-oxo-2-(thienyl-α-vinylene)-1,3,5-cycloheptatriene-1-carboxylic acid yields the 2-dimethylaminopropanol and N-(3-hydroxypropyl)-N⁴-methylpiperazine esters thereof respectively.

EXAMPLE 14

6-hydroxy-7-oxo-2-(p-nitrostyryl)-1,3,5-cycloheptatriene-1-carboxylic acid, ester with 2-dimethylaminoethanol

A. 6-HYDROXY-7-OXO-2-(P-NITROSTYRYL)-1,3,5-CYCLOHEPTATRIENE-1-CARBOXYLIC ACID

Following the procedure set forth in Example 1, part A, but substituting p-nitrobenzaldehyde for benzaldehyde there is obtained 6-hydroxy-7-oxo-2-(p-nitrostyryl),1,3,5-cycloheptatriene-1-carboxylic acid.

B. 6-HYDROXY-7-OXO-2-(P-NITROSTYRYL)-1,3,5-CYCLOHEPTATRIENE-1-CARBOXYLIC ACID, ESTER WITH 2-DIETHYLAMINOETHANOL

Following the procedure set forth in Example 1, part B, but substituting 6-hydroxy-7-oxo-2-(p-nitrostyryl)-1,3,5-cycloheptatriene-1-carboxylic acid for 6-hydroxy-7-oxo-2-styryl-1,3,5-cycloheptatriene-1-carboxylic acid there is obtained 6-hydroxy-7-oxo-2-(p-nitrostyryl) - 1,3,5 - cycloheptatriene-1-carboxylic acid, ester with 2-diethylaminoethanol.

Similarly, following the procedure set forth in Examples 4 and 5 but employing 6-hydroxy-7-oxo-2-(p-nitrostyryl)-1,3,5-cycloheptatriene-1-carboxylic acid yields the 2-dimethylaminopropanol and N-(3-hydroxypropyl)-N⁴-methylpiperazine esters thereof respectively.

EXAMPLE 15

6-hydroxy-7-oxo-2-(4-methylstyryl)-1,3,5 - cycloheptatriene-1-carboxylic acid, ester with 2-diethylaminoethanol

A. 6-HYDROXY-7-OXO-2-(4-METHYLSTYRYL)-1,3,5-CYCLOHEPTATRIENE-1-CARBOXYLIC ACID

Following the procedure set forth in Example 1, part A, but substituting p-tolylaldehyde for benzaldehyde there is obtained 6-hydroxy-7-oxo-2 - (4 - methylstyryl) - 1,3,5-cycloheptatriene-1-carboxylic acid.

B. 6-HYDROXY-7-OXO - 2 - (4 - METHYLSTYRYL)-1,3,5-CYCLOHEPTATRIENE - 1 - CARBOXYLIC ACID, ESTER WITH 2-DIETHYLAMINOETHANOL

Following the procedure set forth in Example 1, part B, but substituting 6-hydroxy-7-oxo-2-(4-methylstyryl)-1,3,5-cycloheptatriene-1-carboxylic acid for 6-hydroxy-7-oxo-2-styryl-1,3,5-cycloheptatriene-1-carboxylic acid there is obtained 6-hydroxy-7-oxo-2-(4-methylstyryl) - 1,3,5 - cycloheptatriene-1-carboxylic acid, ester with 2-diethylaminoethanol.

Similarly, following the procedure set forth in Examples 4 and 5 but employing 6-hydroxy-7-oxo-2-(4-methylstyryl)-1,3,5-cycloheptatriene-1-carboxylic acid yields the 2-dimethylaminopropanol and N⁴-methylpiperazine esters thereof respectively.

EXAMPLE 16

6-hydroxy-7 - oxo-2-styryl - 1,3,5 - cycloheptatriene-1-carboxylic acid, ester with methylaminomethanol Following the procedure of Example 1, part B, but substituting an equivalent amount of methylaminomethyl chloride for 2-diethylaminoethyl chloride yields 6-hydroxy-7-oxo-2-styryl-1,3,5-cycloheptatriene-1 - carboxylic acid, ester with methylaminomethanol.

EXAMPLE 17

6-hydroxy-7-oxo-2-styryl-1,3,5-cycloheptatriene-1-carboxylic acid, ester with 2-benzylaminoethanol Following the procedure of Example 1, part B, but substituting an equivalent amount of 2-benzylaminoethyl chloride for 2-diethylaminoethyl chloride yields 6-hydroxy-7-oxo-2-styryl-1,3,5-cycloheptatriene-1-carboxylic acid, ester with 2-benzylaminoethanol.

EXAMPLE 18

6-hydroxy-7-oxo-2-styryl-1,3,5-cycloheptatriene-1-carboxylic acid, ester with 3-diallylaminopropanol Following the procedure of Example 1, part B, but substituting an equivalent amount of 3-diallylaminopropyl chloride for 2-diethylaminoethyl chloride yields 6-hydroxy-7-oxo-2-styryl-1,3,5-cycloheptatriene - 1 - carboxylic acid, ester with 3-diallylaminopropanol.

EXAMPLE 19

6-hydroxy-7-oxo-2-styryl-1,3,5 - cycloheptatriene - 1 - carboxylic acid, ester with 2-(2-hydroxyethyl)aminoethanol Following the procedure of Exampe 1, part B, but substituting an equivalent amount of 2-(2-hydroxyethyl)-aminoethyl chloride for 2-diethylaminoethyl chloride yields 6-hydroxy-7-oxo-2-styryl-1,3,5-cycloheptatriene - 1-carboxylic acid, ester with 2-(2-hydroxyethyl)aminoethanol.

This invention may be variously otherwise embodied within the scope of the appended claims.

What is claimed is:

1. 6-hydroxy-7-oxo-2-styryl-1,3,5 - cycloheptatriene - 1-carboxylic acid ester with 2-diethylaminoethanol and salts thereof.

2. 6-hydroxy-7-oxo-2-styryl-1,3,5 - cycloheptatriene - 1-carboxylic acid ester with 3-dimethylaminopropanol and salts thereof.

3. A compound of the formula

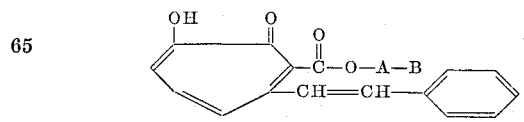

wherein A is lower alkylene and B is di(lower alkyl)-amino.

References Cited

UNITED STATES PATENTS 3,076,016   1/1963   Leto et al. _____ 260—468

(Other references on following page)

FOREIGN PATENTS 6,571  10/1954  Japan.

OTHER REFERENCES

Chemical Abstracts: vol. 45, column 9608 (1951) (abstract of Madeda et al.).

Chemical Abstracts: vol. 47, columns 6390–6392 (1953) (abstract of Nozoe et al.).

Chemical Abstracts: vol. 47, column 7586 (1953) (abstract of Katsura et al.).

Chemical Abstracts: vol. 48, columns 12898–12899 (1954) (abstract of Katsura et al.).

Chemical Abstracts: vol. 50, columns 2532–2533 (abstract of Nozoe et al.).

Crow et al.: J. Chem. Soc., 1952, pp. 3705–3713.

Tarbell et al.: J. Am. Chem. Soc., vol. 81, pp. 3443–6 (1959).

JOHN D. RANDOLPH, *Primary Examiner.*

NICHOLAS S. RIZZO, *Examiner.*

ROBERT T. BOND, *Assistant Examiner.*